United States Patent
Xue et al.

(10) Patent No.: US 11,880,009 B2
(45) Date of Patent: Jan. 23, 2024

(54) METHODS AND DEVICES FOR JOINT TIME-LAPSE FULL-WAVEFORM INVERSION WITH A TIME-LAG COST FUNCTION

(71) Applicant: CGG SERVICES SAS, Massy (FR)

(72) Inventors: Zhiguang Xue, Katy, TX (US); Zhigang Zhang, Houston, TX (US); Ping Wang, Sugarland, TX (US)

(73) Assignee: CGG SERVICES SAS, Massy (FR)

( * ) Notice: Subject to any disclaimer, the term of this patent is extended or adjusted under 35 U.S.C. 154(b) by 157 days.

(21) Appl. No.: 17/380,103

(22) Filed: Jul. 20, 2021

(65) Prior Publication Data

US 2022/0308246 A1 Sep. 29, 2022

Related U.S. Application Data

(60) Provisional application No. 63/167,321, filed on Mar. 29, 2021.

(51) Int. Cl.
*G01V 1/30* (2006.01)
*G01V 1/36* (2006.01)
*G01V 1/28* (2006.01)

(52) U.S. Cl.
CPC .............. *G01V 1/308* (2013.01); *G01V 1/282* (2013.01); *G01V 1/36* (2013.01); *G01V 2210/42* (2013.01); *G01V 2210/51* (2013.01)

(58) Field of Classification Search
None
See application file for complete search history.

(56) References Cited

U.S. PATENT DOCUMENTS

| | | | |
|---|---|---|---|
| 10,324,205 B2 | 6/2019 | Wang et al. | |
| 10,670,751 B2* | 6/2020 | Qin | G01V 1/282 |
| 2015/0362622 A1* | 12/2015 | Denli | G01V 1/282 703/2 |
| 2016/0216389 A1* | 7/2016 | Hu | G01V 1/325 |
| 2016/0282490 A1* | 9/2016 | Qin | G01V 1/303 |
| 2018/0196154 A1* | 7/2018 | Gomes | G01V 1/282 |
| 2021/0063590 A1* | 3/2021 | Cooper | G01V 1/282 |
| 2021/0103064 A1* | 4/2021 | Chen | G01V 1/306 |

OTHER PUBLICATIONS

Albert Tarantola, "Inversion of seismic reflection data in the acoustic approximation," Geophysics, Aug. 1984, pp. 1259-1266, vol. 49, No. 8.

Alison Malcolm et al., "Rapid 4D FWI using a local wave solver," The Leading Edge, Dec. 2016, pp. 1053-1059, vol. 35, No. 12.

Amir Asnaashari et al., "Time-lapse imaging using regularized FWI: a robustness study, Regularized FWI Including Prior Model With Dynamic Weighting," SEG Las Vegas 2012 Annual Meeting, DOI http://dx.doi.org/10.1190/segam2012-0699.1, 2012 SEG, pp. 1-5.

(Continued)

*Primary Examiner* — Lina Cordero
(74) *Attorney, Agent, or Firm* — PATENT PORTFOLIO BUILDERS PLLC

(57) ABSTRACT

Methods and devices according to various embodiments perform full-wave inversion jointly for datasets acquired at different times over the same underground formation using a time-lag cost function with target regularization terms. This approach improves the 4D signal within reservoirs and suppresses 4D noise outside.

20 Claims, 12 Drawing Sheets

(56) References Cited

OTHER PUBLICATIONS

Huseyin Denli et al., "Double-Difference Elastic Waveform Tomography in the Time Domain," SEG Houston 2009 International Exposition and Annual Meeting, 2009, pp. 2302-2306.
J. Virieux et al., "An overview of full-waveform inversion in exploration geophysics," Geophysics, 2009, pp. WCC127-WCC152, vol. 74, No. 6.
Martin Landrø, "Discrimination between pressure and fluid saturation changes from time lapse seismic data," Geophysics, 2001, pp. 836-844, vol. 66, No. 3.
Patrick Lailly, "The-Seismic Inverse Problem as a Sequence of Before Stack Migrations," Conference on inverse scattering: Theory and application, SIAM1983, pp. 206-220.
Ping Wang et al., "Full-waveform inversion for salt: A coming of age," The Leading Edge, Mar. 2019, pp. 204-213.
R. Kamei et al., "Full waveform inversion of repeating seismic events to estimate time-lapse velocity changes," Geophysical Journal International, 2019, pp. 1239-1264, vol. 209, No. 2.
W.A. Mulder et al., "Exploring some issues in acoustic full waveform inversion," Geophysical Prospecting, 2008, pp. 827-841, vol. 56, No. 6.
Zhigang Zhang et al., "Correcting for salt misinterpretation with full-waveform inversion," SEG International Exposition and 88th annual Meeting, 2018, pp. 1143-1147.

\* cited by examiner depth(m)

depth(m)

depth(m)

depth(m)

700

METHODS AND DEVICES FOR JOINT TIME-LAPSE FULL-WAVEFORM INVERSION WITH A TIME-LAG COST FUNCTION

TECHNICAL FIELD

Embodiments of the subject matter disclosed herein generally relate to Full-Waveform Inversion (FWI) methods and devices; more specifically, to FWI methods and devices that jointly invert datasets acquired in the same area at different times (i.e., 4D acquisition).

DISCUSSION OF THE BACKGROUND

During seismic acquisition, seismic receivers detect seismic waves that traveled through geophysical subsurface structures. The receivers record series of amplitude-versus-time pairs that are aggregated as seismic data. The interactions (attenuation, diffraction, refraction, reflection, etc.) inside the subsurface structures cause seismic waves' amplitude variations.

Seismic data processing builds an image of the subsurface structures based on the seismic data. If the properties and locations of seismic sources (emitting the seismic waves) and seismic receivers are known, then an image of the geophysical subsurface structures can be reconstructed based on the seismic data. In other words, seismic data processing yields a profile (image) of the geophysical subsurface. Here, the term "image" has a broader meaning than a two-dimensional grid of pixel values, being rather a 3-dimensional map of one or more attribute values. The most frequently mapped attribute is seismic wave propagation velocity. The attribute values characterize (and thus allow identification of) different material volumes inside the subsurface and therefore enable estimation of the location and shape of interfaces between different materials. While this profile/image does not provide an accurate location for natural resources such as (but not limited to) oil and/or gas, it enables those trained in the field to determine the presence or absence thereof. Obtaining increasingly higher-resolution images is an ongoing process for enhancing natural resource exploration.

Full-waveform inversion (FWI) is a seismic data processing technique that iteratively updates a subsurface model to minimize the difference between synthetic data generated using the model and recorded seismic data. There are many articles describing this technique; for example, some of the earliest and more frequently cited are: "The seismic inverse problem as a sequence of before stack migrations" by P. Lailly, published in *Conference on inverse scattering: Theory and application*, SIAM 1983, pp. 206-220, and "Inversion of seismic reflection data in the acoustic approximation" by A. Tarantola, published in *Geophysics* No. 49, pp. 1259-1266.

FWI has the potential to yield accurate high-resolution velocity models. FIG. 1 generically illustrates an FWI technique having an initial (velocity) model 110, recorded seismic dataset 120 acquired over an explored subsurface and, optionally, additional geophysical information 130, such as other property (e.g., anisotropy, density, etc.) values, well log information, etc. A reflectivity model may be generated at 140 to assess the changes of direction and possible split of incident seismic waves due to reflections and/or refractions at interfaces between different layers. Alternatively, the velocity model may be directly used to generate the simulated dataset. The simulated dataset generated based on the model(s) at 150 is compared with the recorded seismic dataset 120 to update the velocity model at 160. The closer the simulated dataset matches the recorded seismic data, the higher the quality of the model, which is an image of the explored subsurface formation. As already mentioned, FWI is an iterative process (see the loop over 140-160 in FIG. 1), ending after a predetermined number of iterations or when a convergence criterion is met.

Seismic time-lapse analyses (which are referred to as four-dimensional, 4D, seismic) use two or more seismic images (i.e., 3D representations) of the same subsurface based on seismic datasets acquired months or years apart. The earlier acquired seismic dataset is called the baseline while the later acquired seismic dataset(s) is(are) called monitor(s). Time-lapse data acquisition and processing aims to estimate the evolution of the geophysical subsurface formation (which usually contains targeted resources that may be extracted therefrom between successive seismic surveys). Contrast of amplitude versus offset/angle (AVO/AVA) between the baseline and monitor images indicates variation of P- and S-wave velocity and density, which is related to pressure and fluid saturation changes (as explained in the 2001 article "Discrimination between pressure and fluid saturation changes from time-lapse seismic data" by M. Landrø, published in *Geophysics*, Vol. 66(3), pp. 836-844). The same velocity model is usually used for migration (i.e., converting the amplitude versus time pairs into amplitude versus depth) for both baseline and monitor seismic datasets, assuming the impact of 4D velocity changes to the migration difference is a second-order effect.

With improved algorithms and computing power, FWI techniques have emerged as routine tools for Velocity Model Building (VMB), providing an alternative approach for directly building time-lapse change models. Straightforward subtraction of two separate FWI models obtained from baseline and monitor seismic datasets, or parallel inversion, has been applied to obtain the time-lapse changes within reservoirs (as described, for example, in the 2017 article "Full waveform inversion of repeating seismic events to estimate time-lapse velocity changes" by R. Kamei and D. Lumley, published in *Geophysical Journal International*, vol. 209(2), pp. 1239-1264). These results usually suffer from a weak time-lapse signal of the 4D data and uncanceled inversion artifacts caused by the non-repeatability of the baseline and monitor acquisitions. Without a good starting model, the two inversion results may converge to different local minima (as discussed in the 2008 article "Exploring some issues in acoustic full waveform inversion" by W. A. Mulder and R. E. Plessix, published in *Geophysical Prospecting*, vol. 56(6), pp. 827-841).

Attempts to solve the above-noted issues with 4D FWI have failed. For example, double-difference inversion (described in the 2009 article "Double-difference elastic waveform tomography in the time domain" by H. Denli and L. Huang, published in *79th SEG Annual International Meeting, Expanded Abstracts*, pp. 2302-2306) jointly inverts both baseline and monitor datasets, emphasizing the differences of time-lapse data during inversion and reducing the possibility of converging to different local minima for different datasets. However, this double-difference inversion requires nearly perfect repeatability of the time-lapse datasets, which becomes an obstacle for field data applications. The sequential approach (described in the 2014 article "Time-lapse seismic imaging using regularized full-waveform inversion with a prior model: which strategy?" by A. Asnaashari et al., published in *Geophysical Prospecting*, 63(1), pp. 78-98) inverts first the baseline dataset and then the monitor dataset(s) in the order of recording times. This approach does not require perfect repeatability nor an accurate starting model, although better starting model and data repeatability are preferred for optimal inversion results.

Target-oriented inversion (described in the 2016 article "Rapid 4D FWI using a local wave solver" by A. Malcolm and B. Willemsen, published in *The Leading Edge*, No. 35(12), pp. 1053-1059) reduces the model space of the inversion to the area of interest. This approach is valid for 4D application, but it usually assumes good accuracy in the area outside of the target area, which is not always applicable.

Thus; there is a need to propose methods and systems for 4D FWI that overcome all the drawbacks and limitations of conventional approaches. AH the articles cited in this section are incorporated by reference in their entirety.

SUMMARY

Methods and apparatuses according to various embodiments are implementations of an FWI approach that jointly inverts baseline and monitor datasets yielding baseline and monitor models simultaneously. This approach does not require perfect repeatability of the two acquisitions. The combined datasets provide more constraints on the resulting models. A time-lag cost function ensures a stable performance for different data types and different geologic settings and a target-oriented regularization is used to enhance 4D signals in the reservoirs as well as to suppress 4D noise caused by poor data repeatability and possible crosstalk between the inverted baseline and monitor models away from the reservoirs.

According to an embodiment there is an FWI method for exploring an underground formation including obtaining a baseline dataset and a monitor dataset acquired at different times over the underground formation, and generating a synthetic baseline dataset and a synthetic monitor dataset corresponding to the baseline dataset and the monitor dataset, the synthetic baseline dataset and the synthetic monitor dataset being generated using a baseline model and a monitor model of the underground formation, respectively. The method further includes calculating a joint inversion time-lag cost function with a target regularization that includes a total variation, TV, norm and a model difference norm, and updating the baseline model and the monitor model by minimizing the joint inversion time-lag cost function with the target regularization.

According to another embodiment there is a seismic data processing apparatus for evaluating evolution of an underground formation. The apparatus has an interface for obtaining a baseline dataset and a monitor dataset acquired at different times over the underground formation, and data processing unit connected to the interface. The data processing unit is configured to generate a synthetic baseline dataset and a synthetic monitor dataset corresponding to the baseline dataset and the monitor dataset using a baseline model and a monitor model, respectively, to calculate a joint inversion time-lag cost function with target regularization term including at least one of a total variation, TV, norm and a model difference norm, and to update the baseline model and the monitor model jointly such that to minimize the cost function.

According to yet another embodiment there is a non-transitory computer readable recording medium storing executable codes that when executed on a computer make the computer perform a full-waveform inversion, FWI, method for exploring an underground formation. The method includes obtaining a baseline dataset and a monitor dataset acquired at different times over the underground formation, and generating a synthetic baseline dataset and a synthetic monitor dataset corresponding to the baseline dataset and the monitor dataset, the synthetic baseline dataset and the synthetic monitor dataset being generated using a baseline model and a monitor model of the underground formation, respectively. The method further includes calculating a joint inversion time-lag cost function with a target regularization that includes a total variation, TV, norm and a model difference norm, and updating the baseline model and the monitor model by minimizing the joint inversion time-lag cost function with the target regularization.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
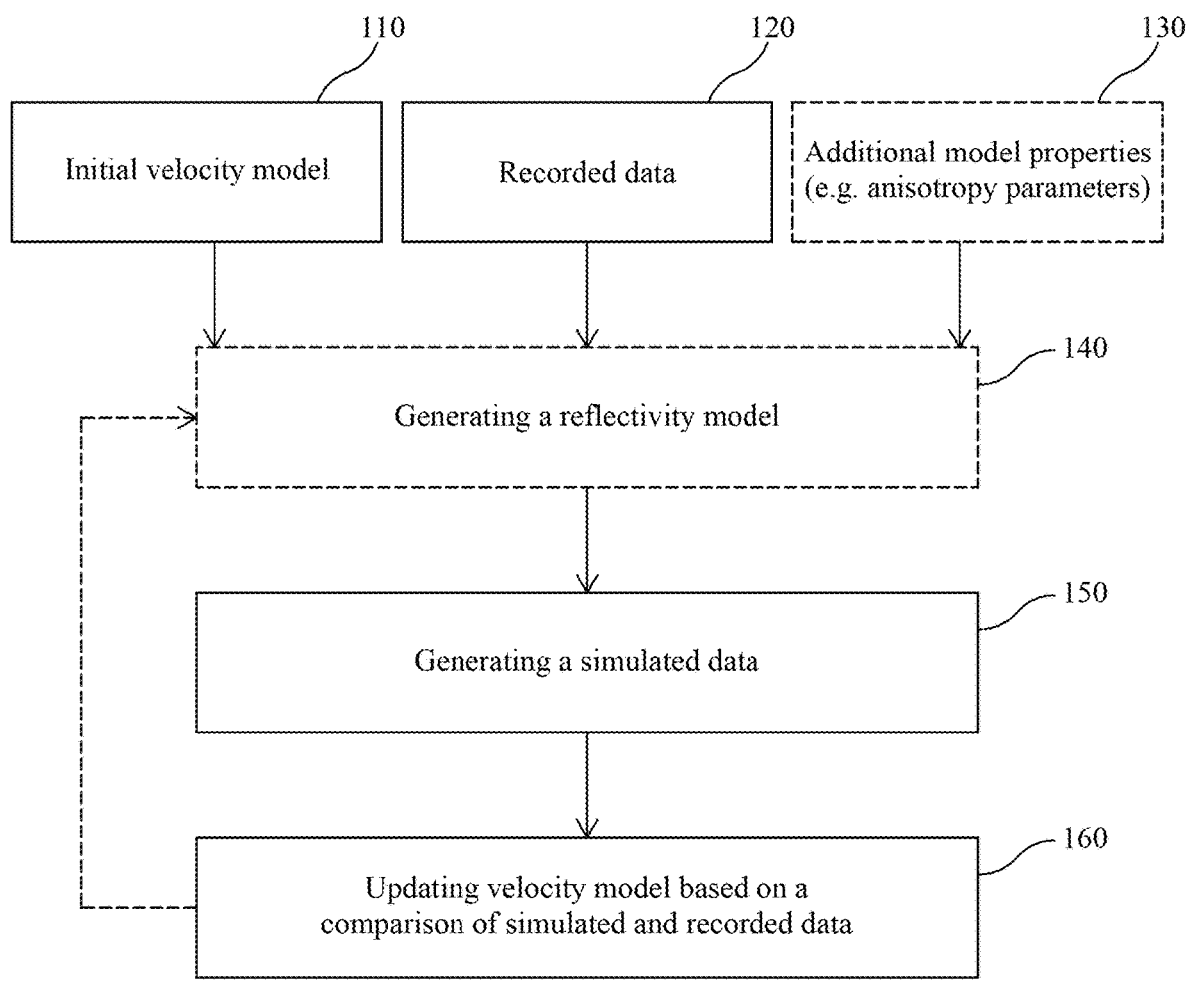
FIG. 1 is diagram illustrating FWI technique.

The following description of the exemplary embodiments refers to the accompanying drawings. The same reference numbers in different drawings identify the same or similar elements. The following detailed description does not limit the invention. Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places is not necessarily referring to the same embodiment. Further, the particular features, structures or characteristics may be combined in any suitable manner in one or more embodiments.

Embodiments described in this section overcome the problem caused by conventional 4D FWI requirements to have repeatability of data acquisition and/or a good initial model. The FWI approach in the following embodiments jointly inverts baseline and monitor datasets to reconstruct both baseline and monitor models at the same time. The combined datasets include more input data, which better constrain the output models. Additionally, a time-lag cost function is used to leverage the stable performance of Time-lag FWI (TLFWI) described in U.S. Pat. No. 10,324, 205 on different data types and different geologic settings (as described, for example, in Zhang et al., 2018; Wang et al., 2019). Furthermore, a target-oriented regularization approach is used to enhance 4D signals in the reservoirs, as well as suppress 4D noise caused by poor data repeatability and possible crosstalk between the inverted baseline and monitor models away from the reservoirs. The synthetic and field data examples demonstrate the effectiveness of this approach to build the time-lapse models and reduce 4D noise when the respective 4D FWI models are used to migrate the baseline and monitor datasets.

TLFWI does not minimize the plain difference between synthetic and recorded seismic data to update the subsurface model, instead minimizing a kinematics-only cost function $\chi$ to mitigate cycle-skipping (i.e., picking a wrong frequency maximum) and amplitude-discrepancy issues as follows:

$$\chi(v) = \Sigma_{s,r,w} c \Delta \tau^2, \quad (1)$$

where v is the velocity model, c is a cross-correlation coefficient between recorded data and modeled synthetic data, w is the window index, $\Delta\tau$ is the time shift between the recorded data and modeled synthetic data, and s and r are the source and receiver index, respectively.

For time-lapse data, the baseline and monitor datasets are inverted jointly $$\chi(v_b, v_m) = \Sigma_{s_b, r_b, w_b} c_b \Delta \tau_b^2 + \Sigma_{s_m, r_m, w_m} c_m \Delta \tau_m^2 + \lambda_1 \|S(v_m - v_b)\|_{TV} + \lambda_2 \|(1-S)(v_m - v_b)\|_2^2 \quad (2)$$

where the subscripts b and m refer to baseline and to monitor, respectively, and $\lambda_1$ and $\lambda_2$ are regularization parameters. The TV-norm is defined as $$\|v\|_{TV} = \Sigma_i \sqrt{|\nabla_x v_i|^2 + |\nabla_y v_i|^2 + |\nabla_z v_i|^2}, \quad (3)$$

where i is the index of spatial grids in Cartesian coordinates (x, y, z). The scaling factor $S \in [0,1]$ is designed based on a target interpretation with a value of 1 in the reservoir and a value of 0 far away from it.

The third and fourth terms in equation 2 effectively apply a total variation (TV) regularization when S=1, a Tikhonov regularization when S=0, and a linear combination of them when S E (0,1). The regularization parameters $\lambda_1$ and $\lambda_2$ are defined into physically meaningful scales in view of the initial velocity models; in practice, the optimal values of these parameters fall into relatively narrow ranges. This approach does not require perfect repeatability of the two surveys, as baseline and monitor data occur exclusively in the first and second terms of the cost function.

Figure 2A:
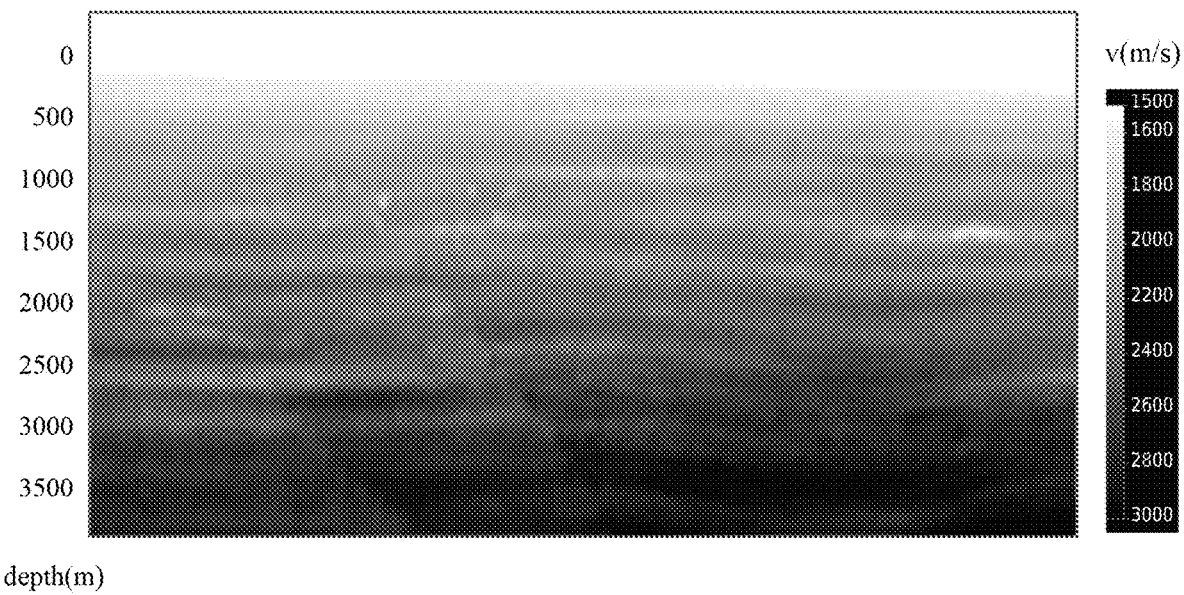
FIGS. 2A-2D are related graphs representing a baseline model, an initial model input to FWI, the true time-lapse difference in the target, and the 4D migration difference obtained using the true baseline and monitor models, respectively.
Figure 2B:
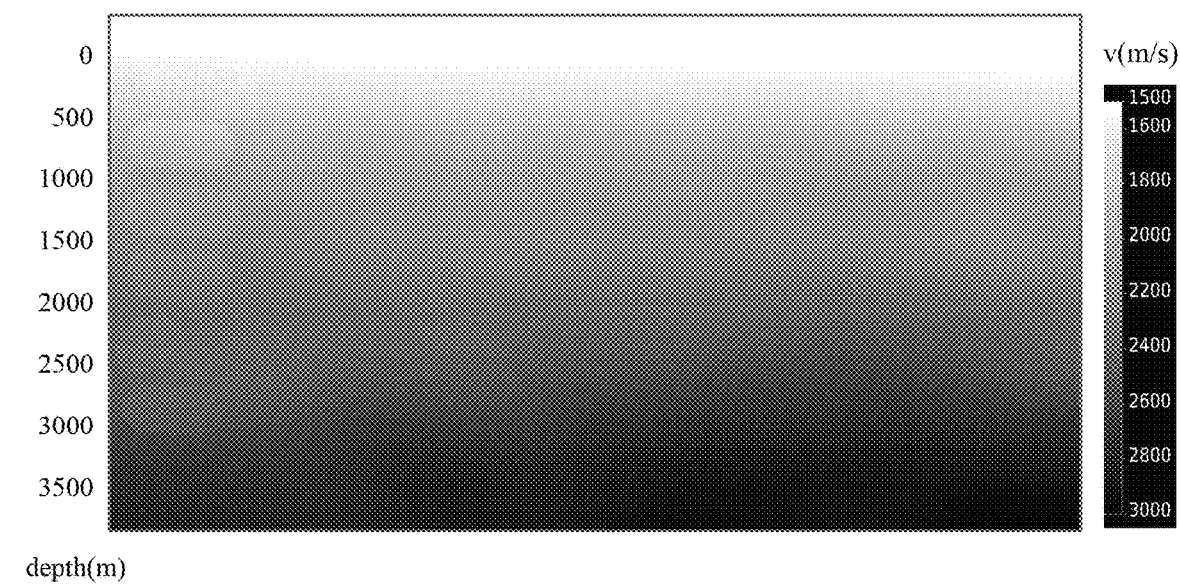
Figure 2C:
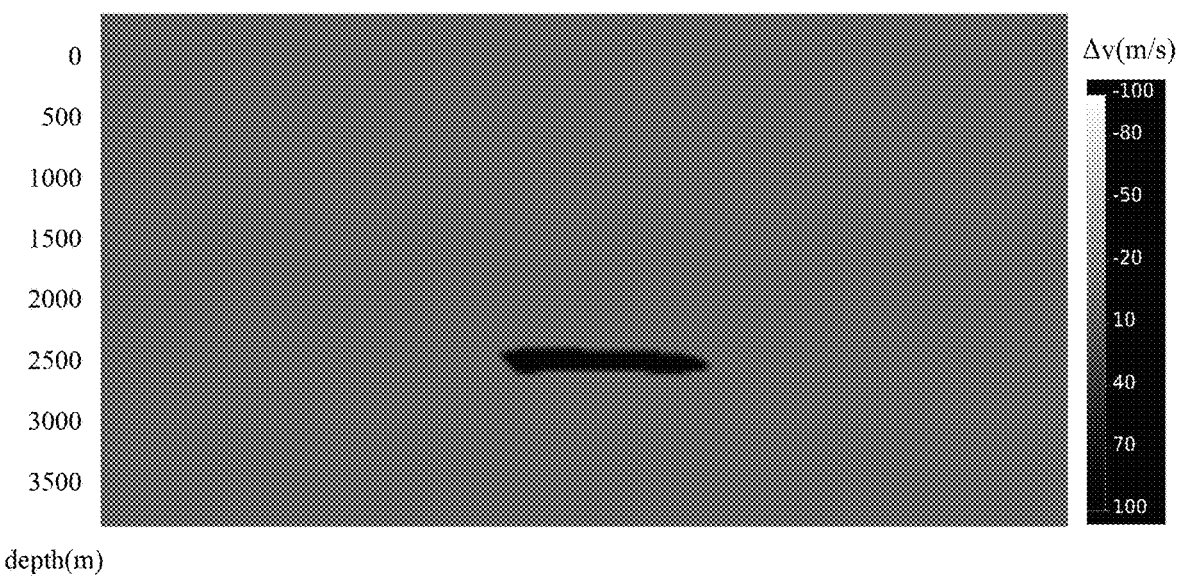
Figure 2D:
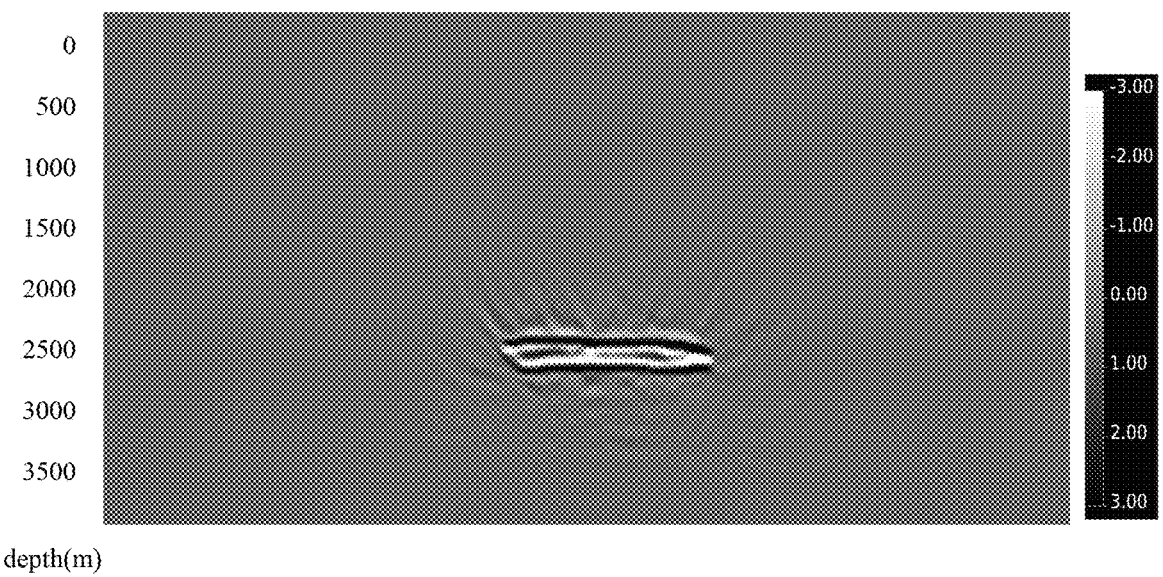

Tests on simulated data are illustrated in FIGS. 2A-2D, which are velocity graphs with the x axis representing a horizontal coordinate over a 24000 m, y depth increasing downwards from surface up to 4000 m, and the nuances of gray corresponding to velocities from about 1500 m/s to 3000 m/s as represented in the legend. Simulated seismic data playing the role of acquired data in these tests is based on a subsurface structure velocity model illustrated in FIG. 2A. The dataset corresponds to 800 shots spaced every 25 m, seismic waves being detected after each shot by 800 receivers. The simulated data was generated using a Ricker wavelet centered at 25 Hz. The initial velocity model used for the FWI tests is illustrated in FIG. 2B, which is a graph having the same coordinates as the graph in FIG. 2A. The monitor model differed from the baseline model in the target area as shown in the graph in FIG. 2C, which has the same x and y axis as the graphs in FIGS. 2A and 2B, but the nuances of gray correspond to the difference according to the associated legend. FIG. 2D illustrates the difference of the migrated images using a simulated baseline and monitor dataset based on true models and serves as a reference for the later test results.

Figure 3A:
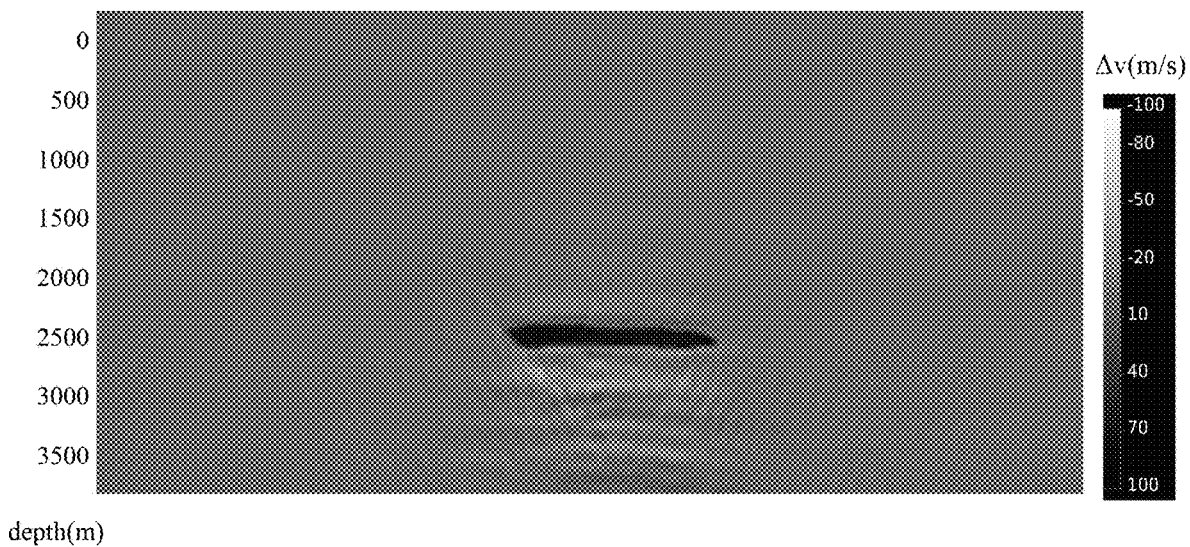
FIGS. 3A-3F are related graphs representing velocity models differences and 4D migration differences obtained using parallel inversion, double-difference inversion and joint 4D FWI of simulated data.
Figure 3B:
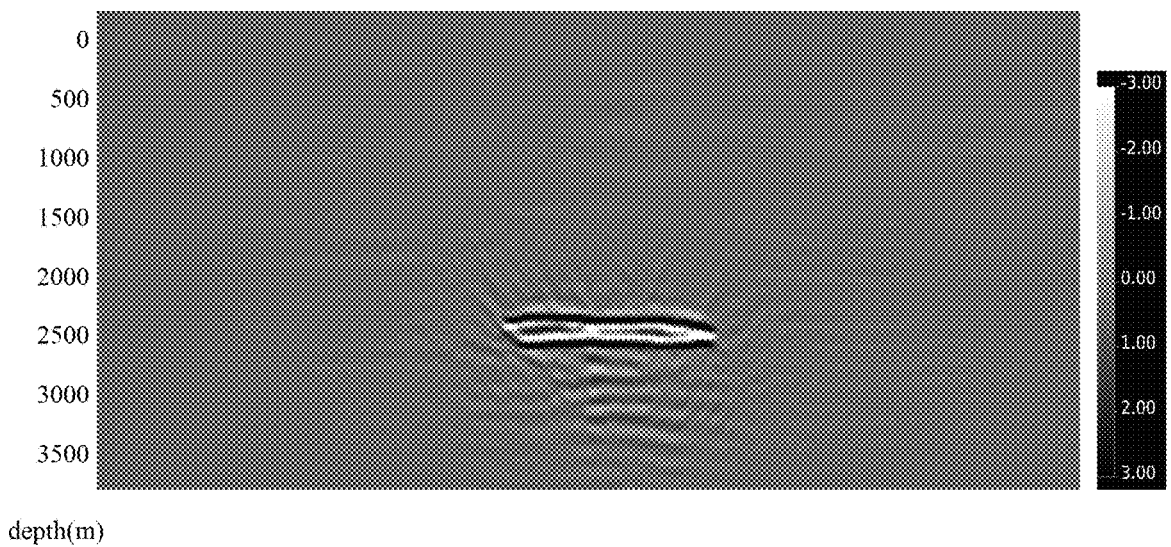

FIGS. 3A-3F are similar graphs representing velocity models differences and 4D migration differences obtained using parallel inversion, double-difference inversion and joint 4D FWI. The vertical axis increasing down is depth, the horizontal axis represents a horizontal coordinate covering a range of 24000 m and as shown in the attached legend the nuances of gray correspond to velocity differences in a +/−100 m/s. FIG. 3A illustrates a difference between the baseline velocity model and monitor velocity model of parallel inversion. Although the updates within the target area are stronger, parallel inversion leaves strong perturbation leakage in the background model. As a result, when datasets are migrated using the resulting models, the 4D migration difference illustrated in FIG. 3B shows noise below the target.

Figure 3C:
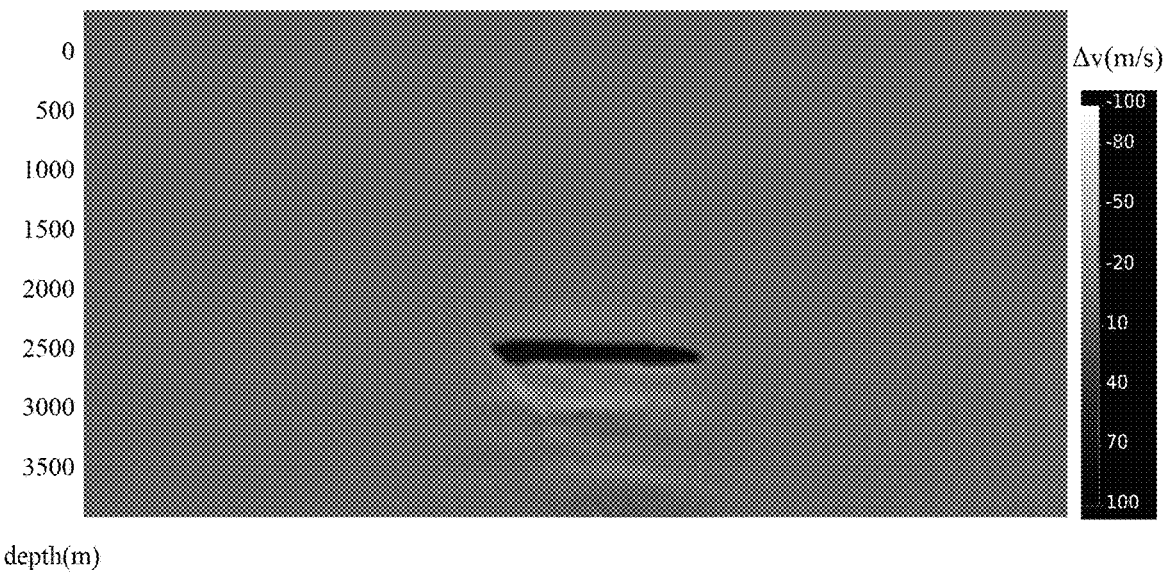
Figure 3D:
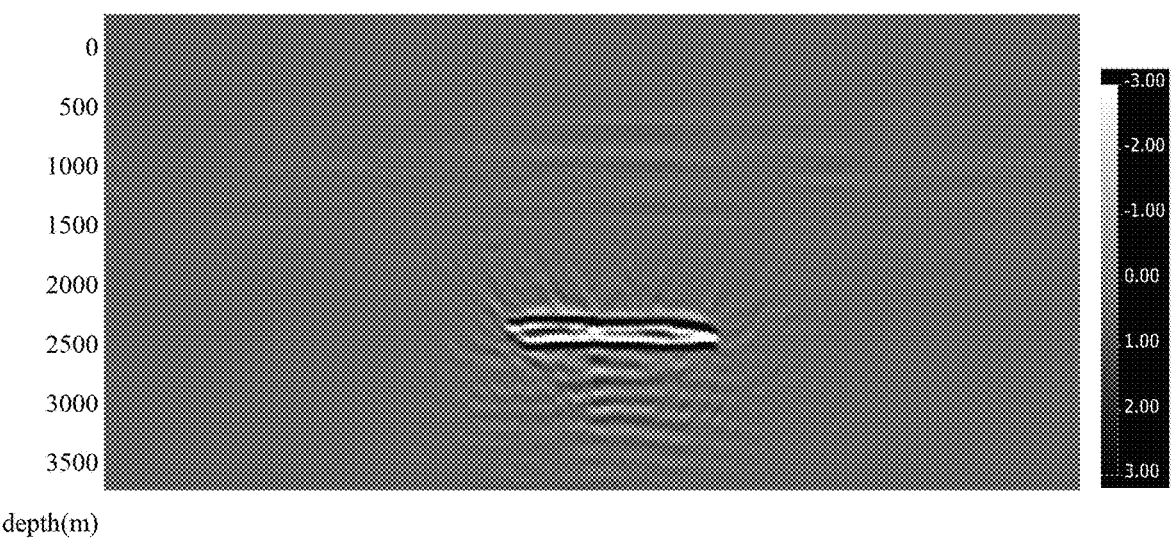

FIG. 3C shows the result of the double-difference method which, compared to the parallel approach, yields smaller leakage outside the target area and improves the 4D migration difference of the velocity model as shown in FIG. 3D.

Figure 3E:
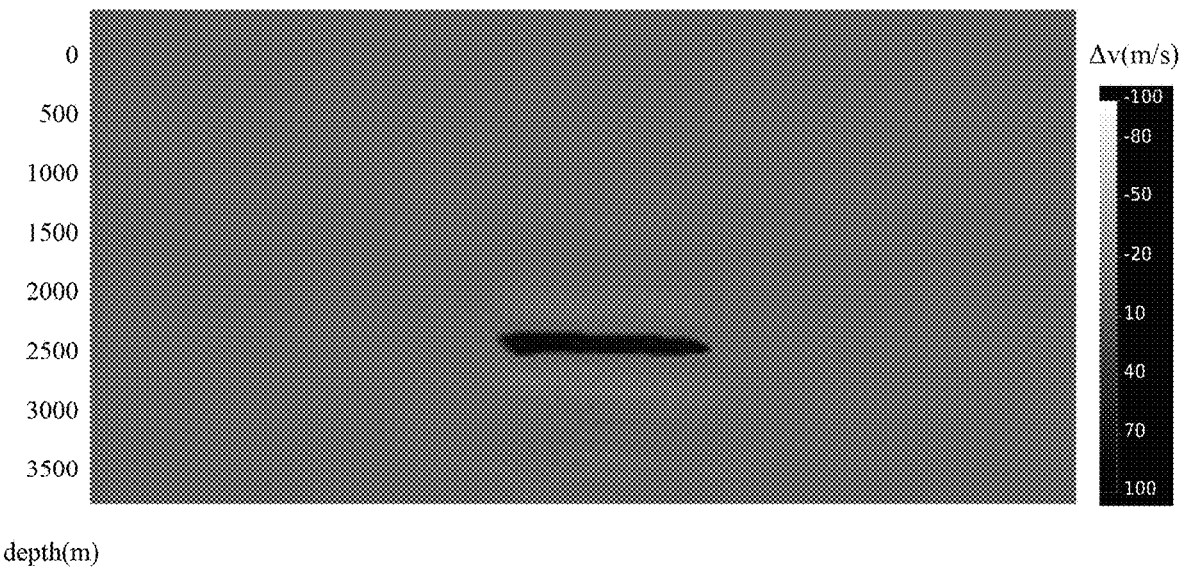
Figure 3F:
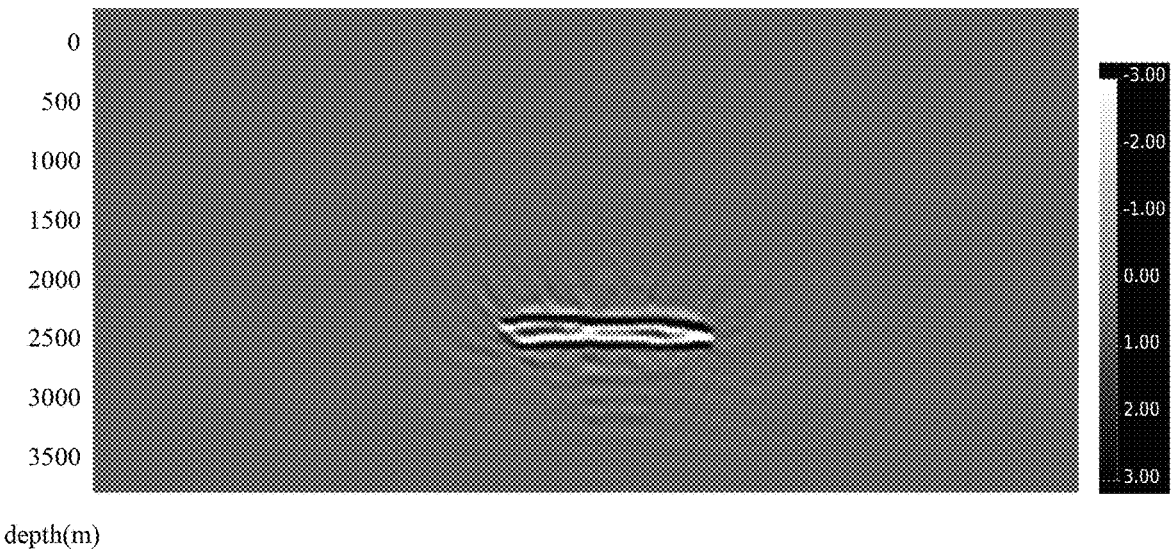

The results of the FWI inversion according to an embodiment (i.e., with a TLFWI and a target-oriented regularization) that updates both the baseline and monitor models in one joint inversion are illustrated in the graphs in FIGS. 3E and 3F. Similar to the pairs of graphs (3A, 3B) and (3C, 3D), the graph 3E represents the difference between the resulting velocity models and the graph in 3F represents the difference of the 4D migrations of baseline and monitor data migrated with their corresponding velocities. This approach leads to a more focused 4D velocity difference within the target area than the double-difference approach, which subsequently yields a reduced 4D migration noise. Among all three 4D FWI approaches, joint 4D FWI gives a 4D velocity and migrated difference best resembling the reference results in FIGS. 2C and 2D for this simulated example.

Another test was performed on real data. The baseline and monitor datasets were acquired at seven-year interval, with a cable length of 3600 m, but at different cable depths: 6 m for the baseline dataset and 15 m for the monitor dataset. The reservoir is situated at a depth of 1200 m, which is around the limit of the diving wave penetration depth of these surveys.

Figure 4A:
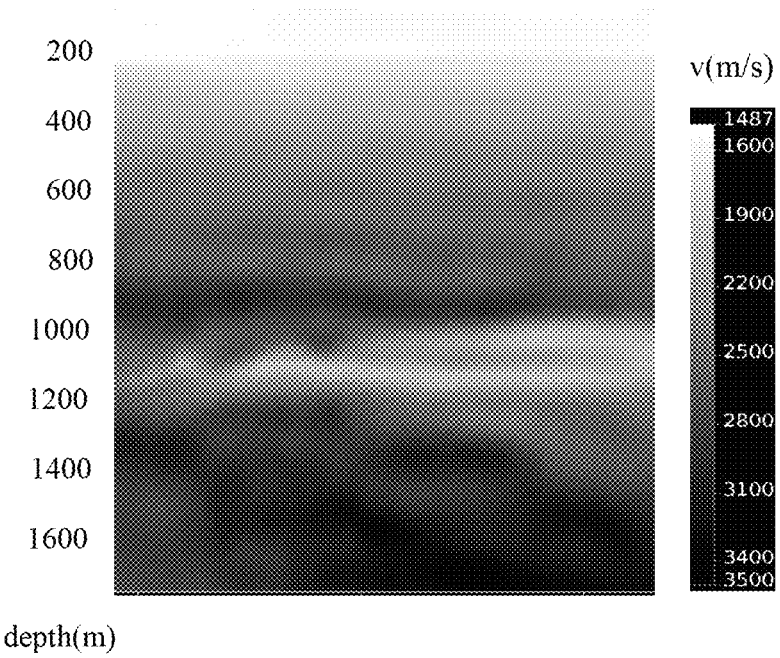
FIGS. 4A-4F are related graphs representing velocity models, velocity models differences and migrated data differences obtained using conventional 4D FWI and joint 4D FWI of real data.
Figure 4B:
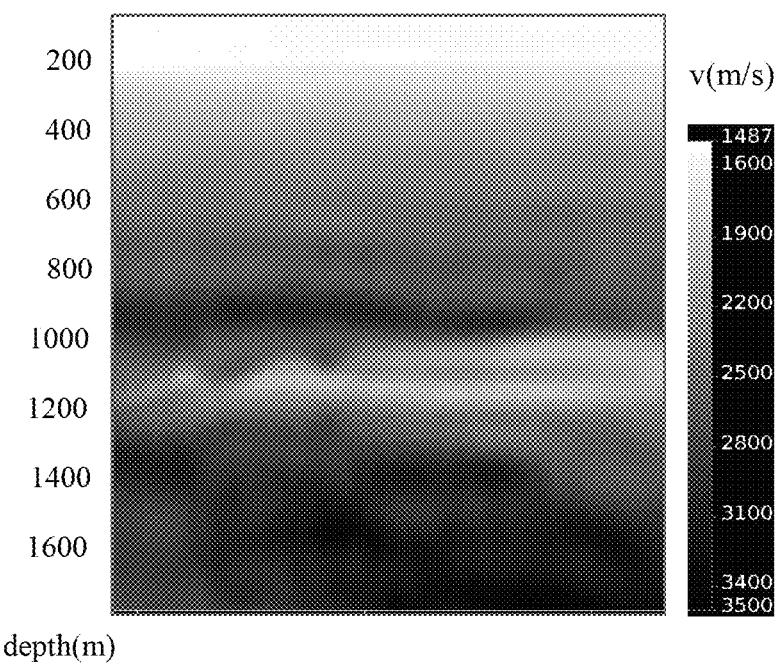
Figure 4C:
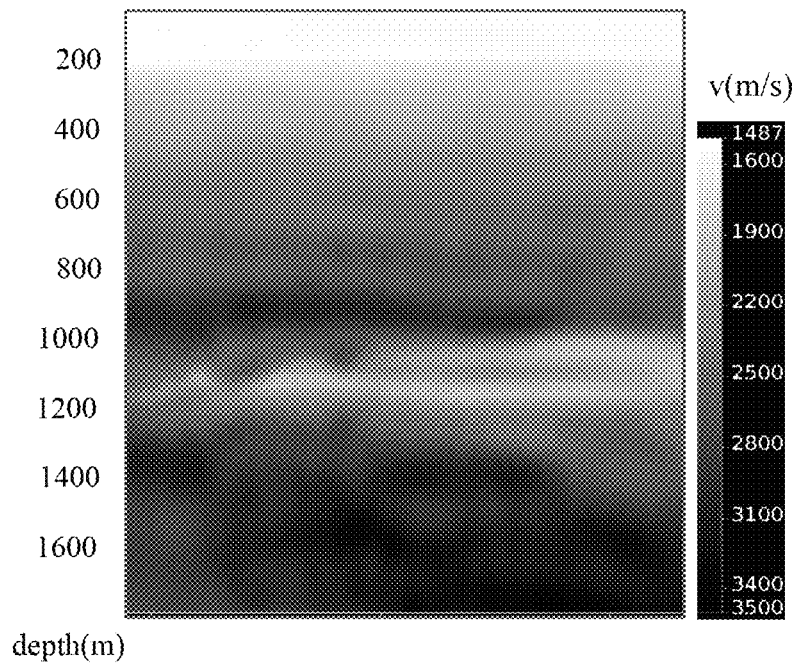
Figure 4D:
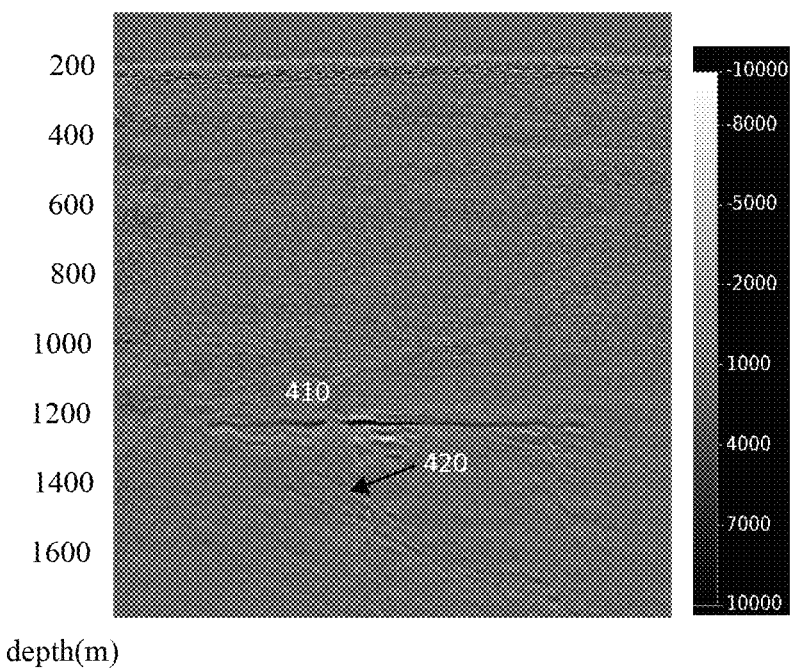
Figure 4E:
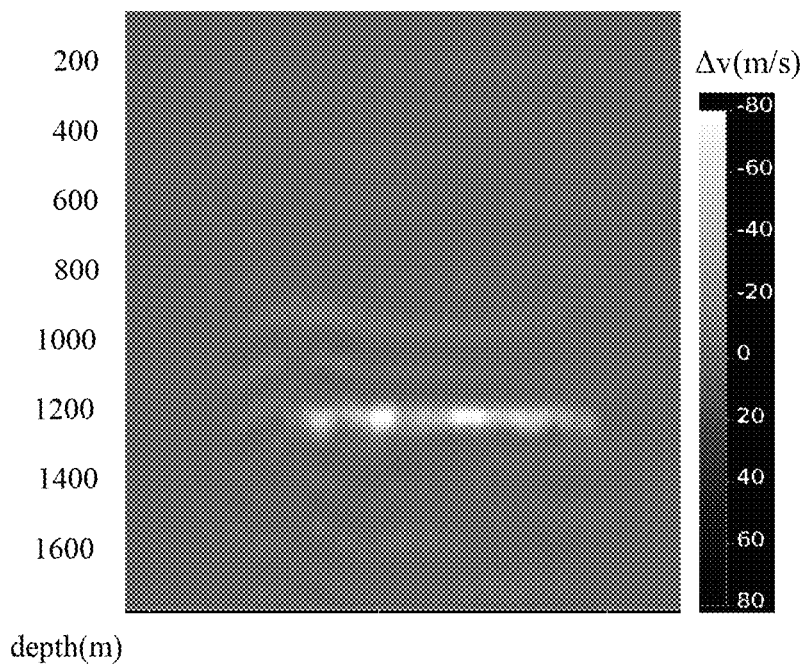
Figure 4F:
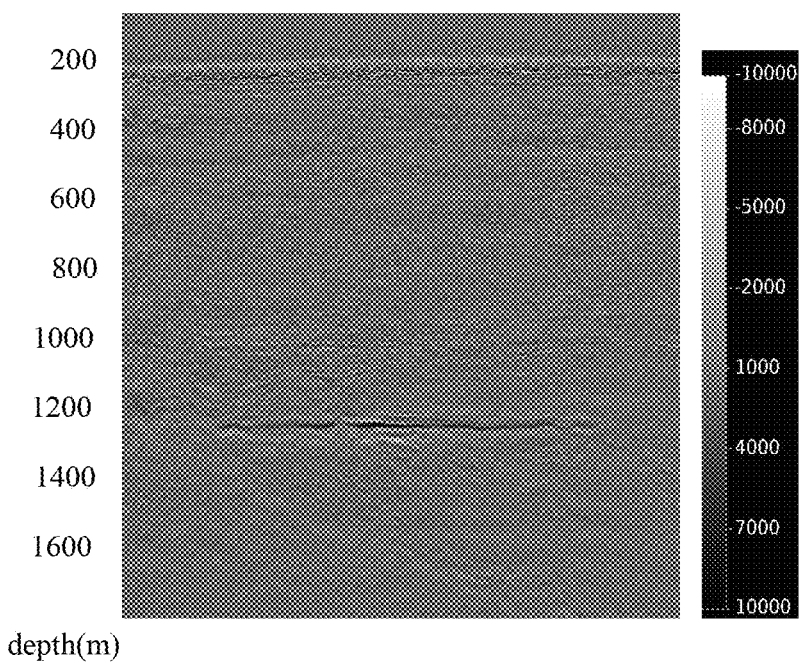

The conventional 4D approach is represented in FIGS. 4A and 4D. FIG. 4A is a velocity model obtained using both baseline and monitor dataset, and FIG. 4D is the difference between migrations with baseline and monitor datasets migrated using this model. In FIG. 4D, there is a clear 4D signal 410 at the reservoir level and some spurious 4D differences in the deeper area (indicated by arrow 420). FIGS. 4B and 4C show the baseline and monitor models from joint 4D FWI with the cost function according to equation (2), respectively. The direct subtraction of both models gives a clear 4D velocity signal around the reservoir (FIG. 4E). The new 4D migration difference from the baseline and monitor datasets using their corresponding velocity models from joint 4D FWI is shown in FIG. 4F, with no sign of the spurious 4D difference seen in FIG. 4D. This indicates that the 4D velocity difference in the reservoir is significant and thus cannot be ignored for the 4D migration difference.

The joint 4D FWI method that simultaneously inverts for the baseline and monitor models using a time-lag cost function and target-oriented regularization terms better avoids common problems of FWI, such as cycle-skipping and amplitude-mismatching between modeled synthetic data and recorded input data. Target-oriented regularization enhances the 4D signals in the reservoirs while suppressing 4D noise away from them. The use of this approach not only provides directly interpretable 4D velocity signals that are consistent with 4D migration signals and production history, but also reduces 4D migration noise, thereby enabling respective velocity models to migrate the baseline and monitor data correspondingly.

Conventionally, strenuous preprocessing steps with extra caution must be carried out to reduce 4D noise from different sources. However, it is very difficult to remove all noise perfectly without preprocessing-induced 4D noise and signal damage. FWI is resilient to noise in the input data because of its inherent stacking procedure. The above-described joint 4D FWI approach can use input datasets with minimal preprocessing, which not only reduces the chance of signal damage, but also significantly reduces the turnaround time.

The 4D signal in the migration difference is usually much weaker than the 3D migration amplitude, and the 4D velocity difference is often even weaker. For this reason, 4D velocity signals can be easily overwhelmed in joint 4D FWI by imperfections such as initial model inaccuracy and input non-repeatability.

The quality of the initial model plays a crucial role in 4D FWI-based VMB. When the error in the initial model is substantial, separate inversions, either parallel or sequential, could converge to quite different local minima. On the other hand, the above-described joint 4D FWI explains both input datasets with a consistent/4D-friendly pair of baseline and monitor models. While this process effectively reduces the risk of converging into two very different local minima, the inversion could still fall into a common or similar local minimum that causes suboptimal 4D signals due to poor focusing and additional 4D noise due to migration artifacts. Therefore, joint 4D FWI needs to start from an initial model that is as good as possible, since the 4D velocity difference is usually very small.

Repeatability is a vital component in conventional 4D processing. Although the above-described joint 4D FWI approach theoretically does not require perfect repeatability of the input data, good repeatability is still key to its success since the 4D velocity difference is usually very small. While evolving technology and acquisition design continue to improve the repeatability of time-lapse data, flawless repeatability has yet to become a reality. Therefore, 4D-binning that is commonly used in conventional 4D processing is still recommended to enhance the repeatability of the input data to joint 4D FWI. Furthermore, a carefully designed target-oriented regularization scheme has an important role in suppressing the 4D noise associated with residual non-repeatability.

Figure 5:
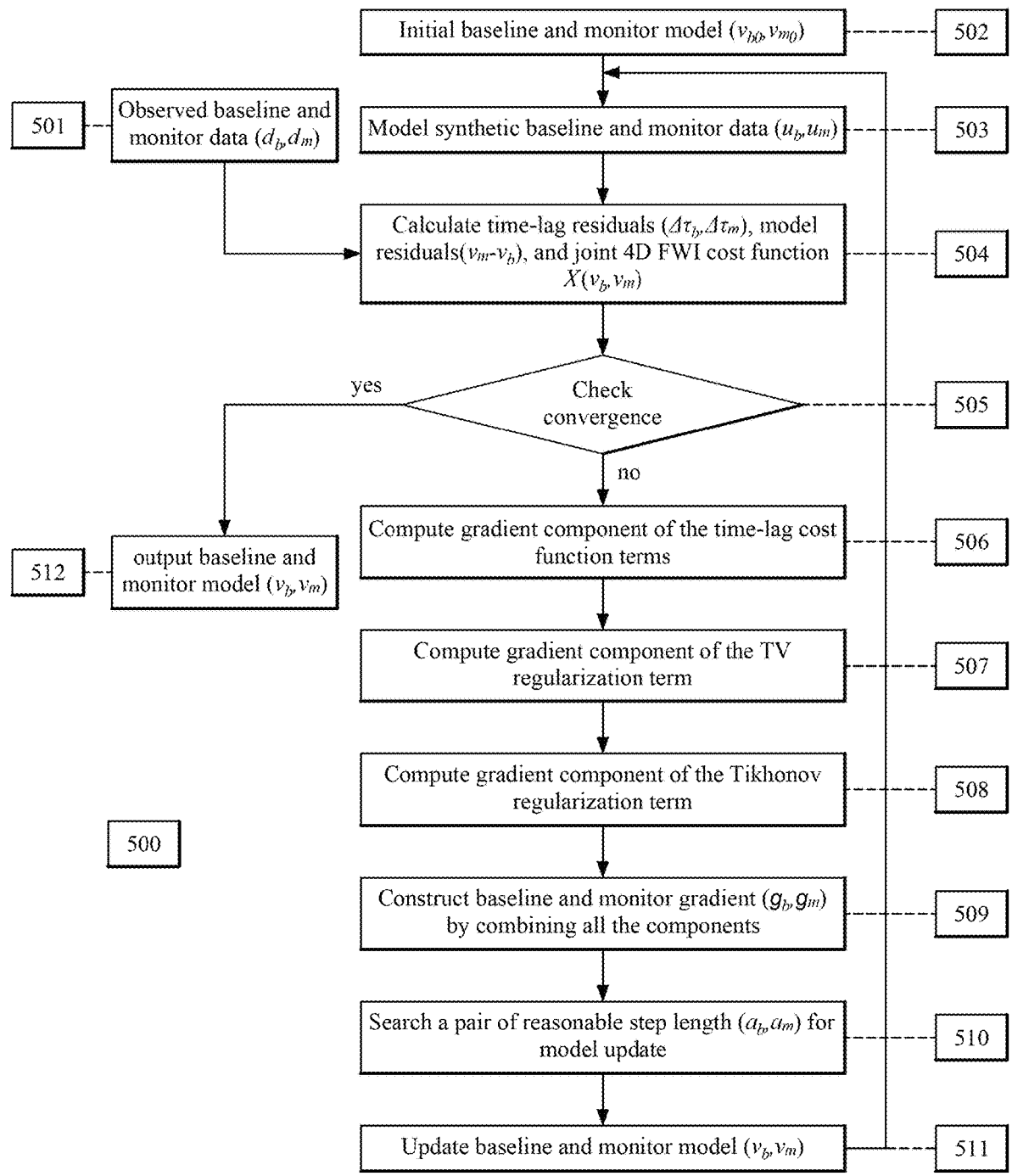
FIG. 5 is a flowchart of a method of joint 4D FWI according to an embodiment.

FIG. 5 illustrates the workflow of a method 500 that performs a joint 4D FWI with time-lag cost function and target regularization to update both baseline and monitor models according to an embodiment. The method starts from observed baseline and monitor datasets obtained at 501 and initial baseline and monitor velocity models received at 502. At each iteration (i.e., loop 503-511), synthetic baseline and monitor datasets are generated to emulate the respective observed datasets, using the current baseline and monitor models ($v_b$, $v_m$). The synthetic baseline dataset $u_b$ and monitor dataset $u_m$ are compared with the observed baseline dataset $d_b$ and monitor dataset $d_m$, respectively, to compute the corresponding time-lag residuals $\Delta\tau_b$ and $\Delta\tau_m$ in step 504. Then the joint 4D FWI cost function $\chi(v_b, v_m)$ in equation (2) is calculated using the time-lag residuals ($\Delta\tau_b$, $\Delta\tau_m$) and model difference $v_m-v_b$ at 504. At 505, this cost function is compared with the user-defined convergence level. If the misfit reaches the convergence threshold or the iteration reaches the maximum number, the iteration of joint 4D FWI stops and the current baseline and monitor models ($v_b$, $v_m$) are saved to a local storage device in step 512. If the misfit is still larger than the convergence threshold, steps 506-511 are performed to improve the current baseline and monitor models.

The gradient components of the time-lag cost function terms in $\chi(v_b, v_m)$ with respect to $v_b$ and $v_m$ are computed at 506. The gradient components of the TV regularization term in $\chi(v_b, v_m)$ with respect to $v_b$ and $v_m$ are computed at 507. The gradient component of the Tikhonov regularization term in $\chi(v_b, v_m)$ with respect to $v_b$ and $v_m$ are computed at 508. Baseline and monitor gradients ($g_b$, $g_m$) are constructed by combining the gradient components from steps 506-508 at 509. At 510, a pair of reasonable step length ($\alpha_b$, $\alpha_m$) is searched with the constructed gradients ($g_b$, $g_m$) by performing line-search method. For example, as described in the 2009 article "An overview of full-waveform inversion in exploration geophysics" by J. Virieux and S. Operto published in Geophysics 74(6), pp. WCC1-WCC26 that is incorporated herein by reference in its entirety, the step length may be calculated using line-search method for a steepest descent optimization approach.

Baseline and monitor gradients ($g_b$, $g_m$), baseline and monitor step length ($\alpha_b$, $\alpha_m$), and some other information like the Hessians are used to update the baseline and monitor models ($v_b$, $v_m$), respectively, at 511. The updated models are then used as new input velocity models to simulate synthetic baseline and monitor data in the next iteration. Steps 503-511 are repeated until the exit condition in step 505 is satisfied.

Although steps 506-509 suggest that different gradient components are computed sequentially and then combined to get final gradients, the mathematical derivation and program implementation of the final gradients are not separate, and steps 506-509 can be merged into a single step.

Figure 6:
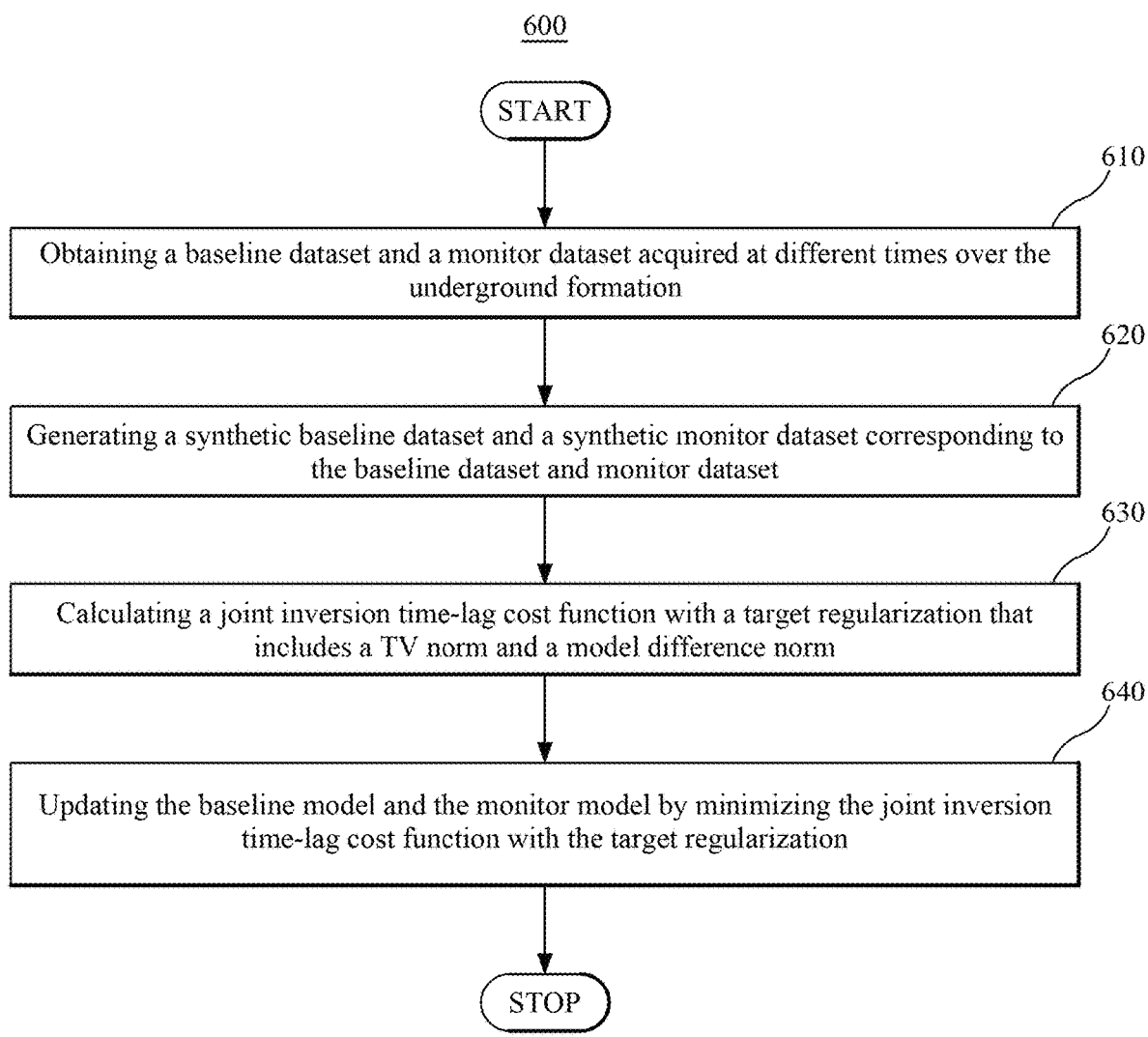
FIG. 6 is a flowchart of a method according to another embodiment.

In a different view, FIG. 6 is a flowchart of a FWI method 600 for exploring an underground formation according to another embodiment. Method 600 includes obtaining a baseline dataset and a monitor dataset acquired at different times over the underground formation at 610. The data acquisition geometry may be different.

Method 600 further includes generating a synthetic baseline dataset and a synthetic monitor dataset corresponding to the baseline dataset and the monitor dataset at 620. The synthetic baseline dataset and the synthetic monitor dataset are generated using a baseline model and a monitor model of the underground formation, respectively.

Method 600 then includes calculating a joint inversion time-lag cost function with a target regularization that includes a total variation, TV, norm and a model difference norm, at 630. Finally, method 600 includes updating the baseline model and the monitor model by minimizing the joint inversion time-lag cost function with the target regularization. The baseline model and the monitor model are images of the explored underground formation usable to locate targeted natural resources (e.g., oil and gas) and monitor their evolution.

The TV norm and the model difference norm may include weights as S and (1−S), respectively, where S∈(0,1) depends on a distance to a target zone, and regularization parameters $\lambda_1$ and $\lambda_2$ are defined to have physically meaningful scales based on initial baseline and monitor models.

The updating of the models (i.e., step 640 of method 600) may include searching a pair of reasonable step lengths for model updates (i.e., different steps for the baseline and for the monitor model).

Steps 620-640 may be repeated until a convergence criterion is met. The convergence criterion may relate to the joint inversion time-lag cost function or may be a predetermined number of iterations.

Method 600 may further include outputting the updated baseline model and the updated monitor model and/or generating a difference between the migrations of the baseline dataset and the monitor dataset using the updated baseline model and the updated monitor model, respectively.

Figure 7:
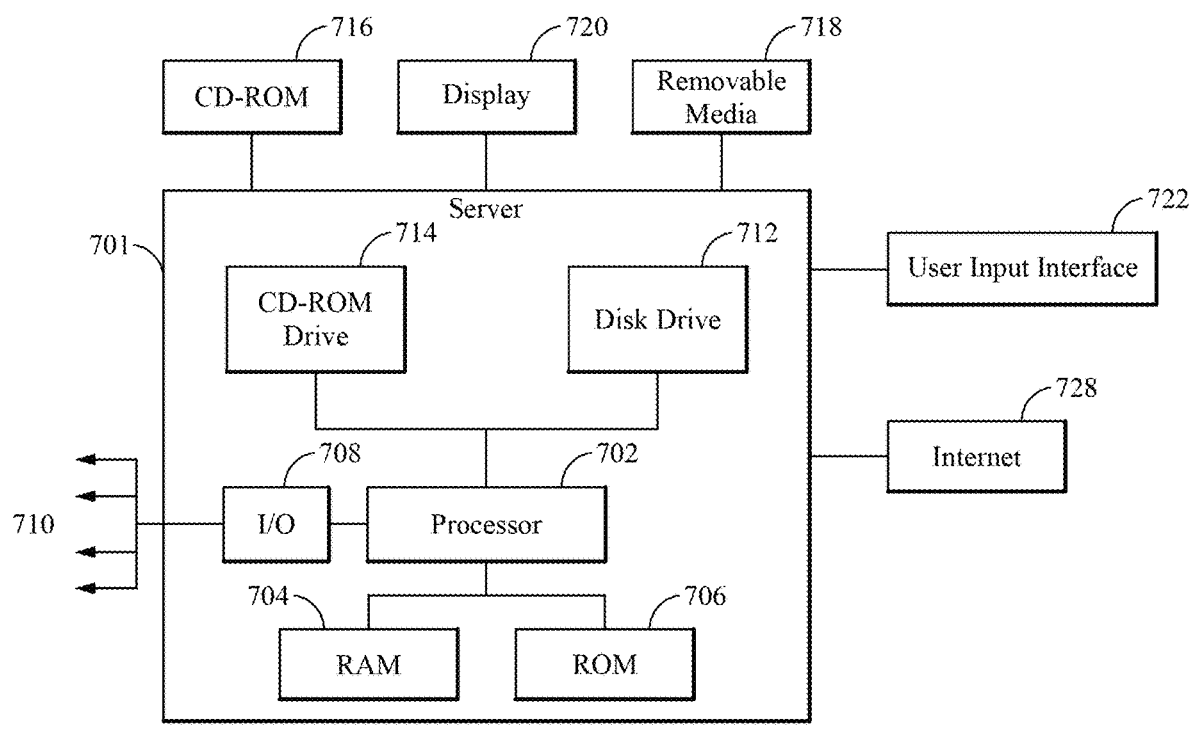
FIG. 7 is a schematic diagram of a computing device configured to perform one or more of the joint 4D FWI methods detailed in the following Description.

The above-discussed methods may be implemented in a computing device as illustrated in FIG. 7. Hardware, firmware, software or a combination thereof may be used to perform the various steps and operations described herein.

Exemplary computing device 700 suitable for performing the steps of the above-described methods according to exemplary embodiments may include a server 701. Such a server 701 may include a central processor (CPU) 702 coupled to a random access memory (RAM) 704 and to a read-only memory (ROM) 706. ROM 706 may also be other types of storage media to store programs, such as programmable ROM (PROM), erasable PROM (EPROM), etc. Processor 702 may communicate with other internal and external components through input/output (I/O) circuitry 708 and bussing 710 to provide control signals and the like. Processor 702 carries out a variety of functions as are known in the art, as dictated by software and/or firmware instructions.

Server 701 may also include one or more data storage devices, including hard drives 712, CD-ROM drives 714 and other hardware capable of reading and/or storing information, such as DVD, etc. In one embodiment, software for carrying out the above-discussed steps may be stored and distributed on a CD-ROM or DVD 716, a USB storage device 718 or other form of media capable of portably storing information. These storage media may be inserted into, and read by, devices such as CD-ROM drive 714, disk drive 712, etc. Server 701 may be coupled to a display 720, which may be any type of known display or presentation screen, such as LCD, plasma display, cathode ray tube (CRT), etc. A user input interface 722 is provided, including one or more user interface mechanisms such as a mouse, keyboard, microphone, touchpad, touch screen, voice-recognition system, etc.

Server 701 may be coupled to other devices, such as sources, detectors, etc. The server may be part of a larger network configuration as in a global area network (GAN) such as the Internet 728, which allows ultimate connection to various landline and/or mobile computing devices. Computing device or computing apparatus 700 can be configured to implement any of the above-discussed procedures and methods, including combinations thereof.

The disclosed exemplary embodiments provide a computing device, software instructions and a method for FWI seismic data processing using a joint inversion time-lag cost function with target regularization. It should be understood that this description is not intended to limit the invention. On the contrary, the exemplary embodiments are intended to cover alternatives, modifications and equivalents. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods.

What is claimed is:

1. A method of monitoring targeted natural resources inside an underground formation, the method comprising:
obtaining a baseline dataset and a monitor dataset acquired during seismic surveys performed at different times over the underground formation;
generating a synthetic baseline dataset and a synthetic monitor dataset corresponding to the baseline dataset and the monitor dataset, the synthetic baseline dataset and the synthetic monitor dataset being generated using a baseline model and a monitor model of the underground formation, respectively;
calculating a joint inversion time-lag cost function with a target regularization that includes a total variation, TV, norm and a model difference norm;
updating the baseline model and the monitor model by minimizing the joint inversion time-lag cost function with the target regularization; and
generating an image of the underground formation for identifying changes of location and/or volume of the targeted natural resources within the underground formation, between the different times when the baseline dataset and the monitor dataset were acquired, based on the updated baseline model and the updated monitor model.

2. The method of claim 1, wherein the TV norm and the model difference norm include weights as S and (1−S), respectively, where S $\in(0,1)$ depends on a distance to a target zone, and regularization parameters $\lambda_1$ and $\lambda_2$ are defined to have physically meaningful scales based on initial baseline and monitor models.

3. The method of claim 1, wherein the updating comprises searching a pair of reasonable step lengths for model updates.

4. The method of claim 1, wherein the generating of the synthetic baseline dataset and the synthetic monitor dataset, the calculating of the joint inversion time-lag cost function and the updating of the baseline model and the monitor model are reiterated until a convergence criterion is met.

5. The method of claim 4, wherein the convergence criterion is related to the joint inversion time-lag cost function.

6. The method of claim 1, further comprising:
outputting the updated baseline model and the updated monitor model.

7. The method of claim 1, further comprising:
generating a difference between migrations of the baseline dataset and the monitor dataset using the updated baseline model and the updated monitor model, respectively.

8. A seismic data processing apparatus for monitoring evolution of targeted natural resources inside an underground formation, the seismic data processing apparatus comprising:
an interface for obtaining a baseline dataset and a monitor dataset acquired during seismic surveys performed at different times over the underground formation;

a data processing unit connected to the interface and configured:

to generate a synthetic baseline dataset and a synthetic monitor dataset corresponding to the baseline dataset and the monitor dataset using a baseline model and a monitor model, respectively;

to calculate a joint inversion time-lag cost function with target regularization term including at least one of a total variation, TV, norm and a model difference norm;

to update the baseline model and the monitor model jointly such that to minimize the joint inversion time-lag cost function; and to generate an image of the underground formation to identify changes of location and/or volume of the targeted natural resources within the underground formation, between the different times when the baseline dataset and the monitor dataset were acquired, based on the updated baseline model and the updated monitor model.

9. The seismic data processing apparatus of claim 8, wherein the data processing unit weights the TV norm and the model difference norm depending on a distance to a target zone.

10. The seismic data processing apparatus of claim 8, wherein the data processing unit searches a pair of reasonable step lengths for model updates.

11. The seismic data processing apparatus of claim 8, wherein the data processing unit generates the synthetic baseline dataset and the synthetic monitor dataset, calculates the joint inversion time-lag cost function and updates jointly the baseline model and the monitor model repeatedly until a convergence criterion is met.

12. The seismic data processing apparatus of claim 11, wherein the convergence criterion is related to the joint inversion time-lag cost function.

13. The seismic data processing apparatus of claim 11, wherein the data processing unit controls the interface to output the updated baseline model and the updated monitor model after the convergence criterion is met.

14. The seismic data processing apparatus of claim 8, wherein the data processing unit is further configured to generate a difference between migrations of the baseline dataset and the monitor dataset using the updated baseline model and the updated monitor model, respectively.

15. A non-transitory computer readable recording medium storing executable codes that when executed on a computer make the computer perform a method for monitoring targeted natural resources inside an underground formation, the method comprising:

obtaining a baseline dataset and a monitor dataset acquired during seismic surveys performed at different times over the underground formation;

generating a synthetic baseline dataset and a synthetic monitor dataset corresponding to the baseline dataset and the monitor dataset, the synthetic baseline dataset and the synthetic monitor dataset being generated using a baseline model and a monitor model of the underground formation, respectively;

calculating a joint inversion time-lag cost function with a target regularization that includes a total variation, TV, norm and a model difference norm;

updating the baseline model and the monitor model by minimizing the joint inversion time-lag cost function with the target regularization; and generating an image of the underground formation for identifying changes of location and/or volume of the targeted natural resources within the underground formation, between the different times when the baseline dataset and the monitor dataset were acquired, based on the updated baseline model and the updated monitor model.

16. The non-transitory computer readable recording medium of claim 15, wherein the TV norm and the model difference norm include weights as S and (1−S), respectively, where $S \in (0,1)$ depends on a distance to a target zone, and regularization parameters $\lambda_1$ and $\lambda_2$ are defined to have physically meaningful scales based on initial baseline and monitor models.

17. The non-transitory computer readable recording medium of claim 15, wherein the generating of the synthetic baseline dataset and the synthetic monitor dataset, the calculating of the joint inversion time-lag cost function and the updating of the baseline model and the monitor model are reiterated until a convergence criterion is met.

18. The non-transitory computer readable recording medium of claim 17, wherein the convergence criterion is related to the joint inversion time-lag cost function.

19. The non-transitory computer readable recording medium of claim 15, further comprising:

outputting the updated baseline model and the updated monitor model.

20. The non-transitory computer readable recording medium of claim 15, further comprising:

generating a difference between migrations of the baseline dataset and the monitor dataset using the updated baseline model and the updated monitor model, respectively.

* * * * *